US012681968B2

(12) United States Patent
Bosnjakovic et al.

(10) Patent No.: US 12,681,968 B2
(45) Date of Patent: Jul. 14, 2026

(54) SELECTING AGENTS TO RESPOND TO USER QUERIES

(71) Applicant: Intuit Inc., Mountain View, CA (US)

(72) Inventors: Dusan Bosnjakovic, Los Angeles, CA (US); Prarit Lamba, San Diego, CA (US); Farzaneh Khoshnevisan, San Diego, CA (US); Byungkyu Kang, San Diego, CA (US); Anmol Joshi, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 181 days.

(21) Appl. No.: 18/750,618

(22) Filed: Jun. 21, 2024

(65) Prior Publication Data

US 2025/0390515 A1      Dec. 25, 2025

(51) Int. Cl.
*G06F 16/3329*      (2025.01)
*G06F 16/334*      (2025.01)
*G06F 16/34*      (2019.01)
*G06F 40/20*      (2020.01)

(52) U.S. Cl.
CPC ...... *G06F 16/3329* (2019.01); *G06F 16/3344* (2019.01); *G06F 16/345* (2019.01); *G06F 40/20* (2020.01)

(58) Field of Classification Search
CPC ....... G06F 16/33; G06F 16/3329; G06F 40/20
See application file for complete search history.

(56) References Cited

U.S. PATENT DOCUMENTS

| | | | | |
|---|---|---|---|---|
| 10,629,191 | B1 * | 4/2020 | Cheng | G06F 40/205 |
| 11,855,860 | B1 * | 12/2023 | Kumar | G06N 3/0455 |
| 12,061,970 | B1 * | 8/2024 | Lo | G06N 3/10 |
| 12,361,004 | B1 | 7/2025 | Dong et al. | |
| 2004/0044516 | A1 * | 3/2004 | Kennewick | G10L 15/1822 704/E15.04 |
| 2007/0050191 | A1 * | 3/2007 | Weider | G06F 16/951 704/E15.04 |
| 2009/0150156 | A1 * | 6/2009 | Kennewick | G01C 21/3608 704/275 |
| 2011/0112827 | A1 * | 5/2011 | Kennewick | G10L 15/22 704/226 |
| 2019/0213622 | A1 * | 7/2019 | Strowbridge | G06Q 30/0631 |
| 2019/0347068 | A1 * | 11/2019 | Khaitan | G06F 3/167 |
| 2020/0342018 | A1 * | 10/2020 | Lange | G06F 16/215 |
| 2022/0114463 | A1 | 4/2022 | Tumuluri | |
| 2024/0202221 | A1 | 6/2024 | Siebel et al. | |
| 2024/0296279 | A1 | 9/2024 | Gardner | |
| 2025/0005530 | A1 * | 1/2025 | Maciver | G06F 16/211 |
| 2025/0078823 | A1 * | 3/2025 | Fan | G06F 40/35 |
| 2025/0086647 | A1 * | 3/2025 | Gao | G06Q 30/015 |

(Continued)

*Primary Examiner* — Shaun Roberts
(74) *Attorney, Agent, or Firm* — Paradice and Li LLP

(57) ABSTRACT

Aspects of the present disclosure relate to an online resource that can initiate a conversation between a user and an automated assistant provided by the online resource. The online resource identifies a plurality of queries from the user during the conversation between the user and the automated assistant and determines a context for each query. The online resource selects an agent for each query based on its context, and then sends the queries to their respective selected agents to generate responses. The online resource combines the responses received from the selected agents to form an answer to the query, and then provides the answer to the user.

14 Claims, 5 Drawing Sheets

(56) References Cited

U.S. PATENT DOCUMENTS

| | | | |
|---|---|---|---|
| 2025/0231942 A1* | 7/2025 | Dong ..................... | G06F 16/248 |
| 2025/0274336 A1* | 8/2025 | Chen ....................... | H04L 41/16 |
| 2025/0371498 A1* | 12/2025 | Gonzalez Hernandez ................. | |
| | | | G06Q 10/103 |

* cited by examiner

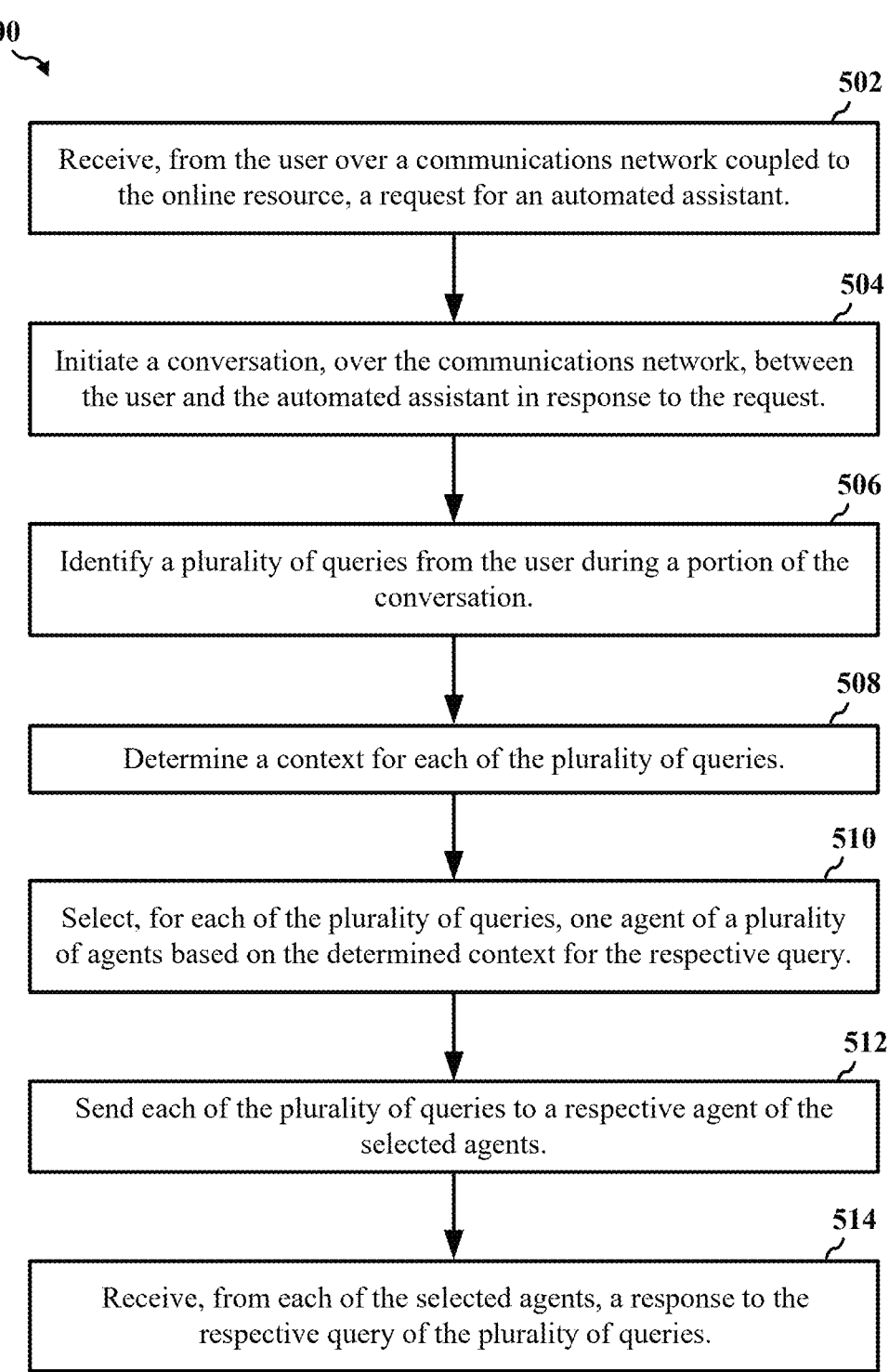

500

502

Receive, from the user over a communications network coupled to the online resource, a request for an automated assistant.

504

Initiate a conversation, over the communications network, between the user and the automated assistant in response to the request.

506

Identify a plurality of queries from the user during a portion of the conversation.

508

Determine a context for each of the plurality of queries.

510

Select, for each of the plurality of queries, one agent of a plurality of agents based on the determined context for the respective query.

512

Send each of the plurality of queries to a respective agent of the selected agents.

514

Receive, from each of the selected agents, a response to the respective query of the plurality of queries.

Combine the responses from the selected agents into an answer responsive to the plurality of queries.

524

Transmit the answer to the user over the communications network.

526

Present the answer to user as part of the conversation between the automated assistant and the user.

SELECTING AGENTS TO RESPOND TO USER QUERIES

TECHNICAL FIELD

This disclosure relates generally to generative artificial intelligence (AI) models, such as large language models (LLMs), and more specifically to the processing of multi-part user questions or queries using generative artificial intelligence (AI) models for generating responses to such questions or prompts.

DESCRIPTION OF RELATED ART

Automated assistants can be used to provide users with product and/or service assistance in a cost-effective manner. In many cases, automated assistants may employ multiple large language models (LLMs) that can be trained to generate responses to different user questions or queries. One popular LLM is ChatGPT® from OpenAIR. The ChatGPT model receives a user input requesting a text output from the model and generates text output based on the user input. While ChatGPT is one example LLM, various other LLMs can be used including, for example, InstructGPT, GPT-4, Google® Bard, and so on. Due to differing configurations and training processes, LLMs can have specialized functions. For example, a particular LLM may be considerably better at answering some types of user questions than other types of user questions, and one LLM may be considerably better at answering some types of user questions than another LLM. As such, an automated assistant may use a variety of different LLMs for answering different types of questions from various users.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure can be implemented as a method for routing user requests from an automated assistant associated with an online resource. The method may be performed by one or more processors of a computing system associated with the online resource, and can include receiving, from the user over a communications network coupled to the computing system, a request for an automated assistant and initiating a conversation, over the communications network, between the user and the automated assistant in response to the request. The method also includes identifying a plurality of queries from the user during a portion of the conversation and determining a context for each of the plurality of queries. The method also includes selecting, for each of the plurality of queries, one agent of a plurality of agents based on the determined context for the respective query and sending each of the plurality of queries to a respective agent of the selected agents, and receiving, from each of the selected agents, a response to the respective query of the plurality of queries. Selecting the agent for a respective query includes comparing the context for the respective query with an agent description associated with the selected agent. In some aspects, the online resource 120 determines a degree of similarity between the context and the agent descriptions for the plurality of agents, and then selects the agent associated with the highest degree of similarity to generate the response for the respective sub-query.

The method can also include combining the responses from the selected agents into an answer responsive to the plurality of queries and transmitting the answer to the user over the communications network. In some aspects, the method can also include presenting the answer to the user as part of the conversation between the automated assistant and the user. The conversation can be conducted over an online chat, a messaging feature accessible to the user, or a voice call with the user, among other examples.

In various aspects, different agents of the plurality of agents can be configured to generate responses to different queries associated with different contexts or different groups of contexts. In some instances, each of the plurality of agents is associated with a corresponding large language model (LLM) trained using query-and-response training data associated with a unique context or a unique group of contexts. The context for a given query can include one or more previous portions of the conversation or a browsing history of the user within a user assistance page or website associated with the online resource, among other examples. In addition, or in the alternative, the context for a given query can be based at least in part on a type of application through which the user sends the request to the online resource.

Another innovative aspect of the subject matter described in this disclosure can be implemented in a computing system associated with an online resource. The computing system, which can be used to route user requests from an automated assistant associated with the online resource, includes one or more processors coupled to a memory. The memory stores instructions that, when executed by the one or more processors, causes the computing system to receive, from the user over a communications network coupled to the computing system, a request for an automated assistant and to initiate a conversation, over the communications network, between the user and the automated assistant in response to the request. Execution of the instructions causes the computing system to identify a plurality of queries from the user during a portion of the conversation and to determine a context for each of the plurality of queries. Execution of the instructions causes the computing system to select, for each of the plurality of queries, one agent of a plurality of agents based on the determined context for the respective query, to send each of the plurality of queries to a respective agent of the selected agents and to receive, from each of the selected agents, a response to the respective query of the plurality of queries. Selecting the agent for a respective query includes comparing the context for the respective query with an agent description associated with the selected agent. In some aspects, the online resource 120 determines a degree of similarity between the context and the agent descriptions for the plurality of agents, and then selects the agent associated with the highest degree of similarity to generate the response for the respective sub-query.

Execution of the instructions can also cause the computing system to combine the responses from the selected agents into an answer responsive to the plurality of queries and to transmit the answer to the user over the communications network. In some aspects, execution of the instructions also causes the computing system to present the answer to the user as part of the conversation between the automated assistant and the user. The conversation can be conducted over an online chat, a messaging feature accessible to the user, or a voice call with the user, among other examples.

In various aspects, different agents of the plurality of agents can be configured to generate responses to different queries associated with different contexts or different groups of contexts. In some instances, each of the plurality of agents is associated with a corresponding LLM trained using query-and-response training data associated with a unique context or a unique group of contexts. The context for a given query can include one or more previous portions of the conversation or a browsing history of the user within a user assistance page or website associated with the online resource, among other examples. In addition, or in the alternative, the context for a given query can be based at least in part on a type of application through which the user sends the request to the online resource.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5A shows an illustrative flowchart depicting an example operation for routing user requests from an automated assistant associated with an online resource, according to some implementations.

Like reference numbers and designations in the various drawings indicate like elements.

DETAILED DESCRIPTION

Figure 1:
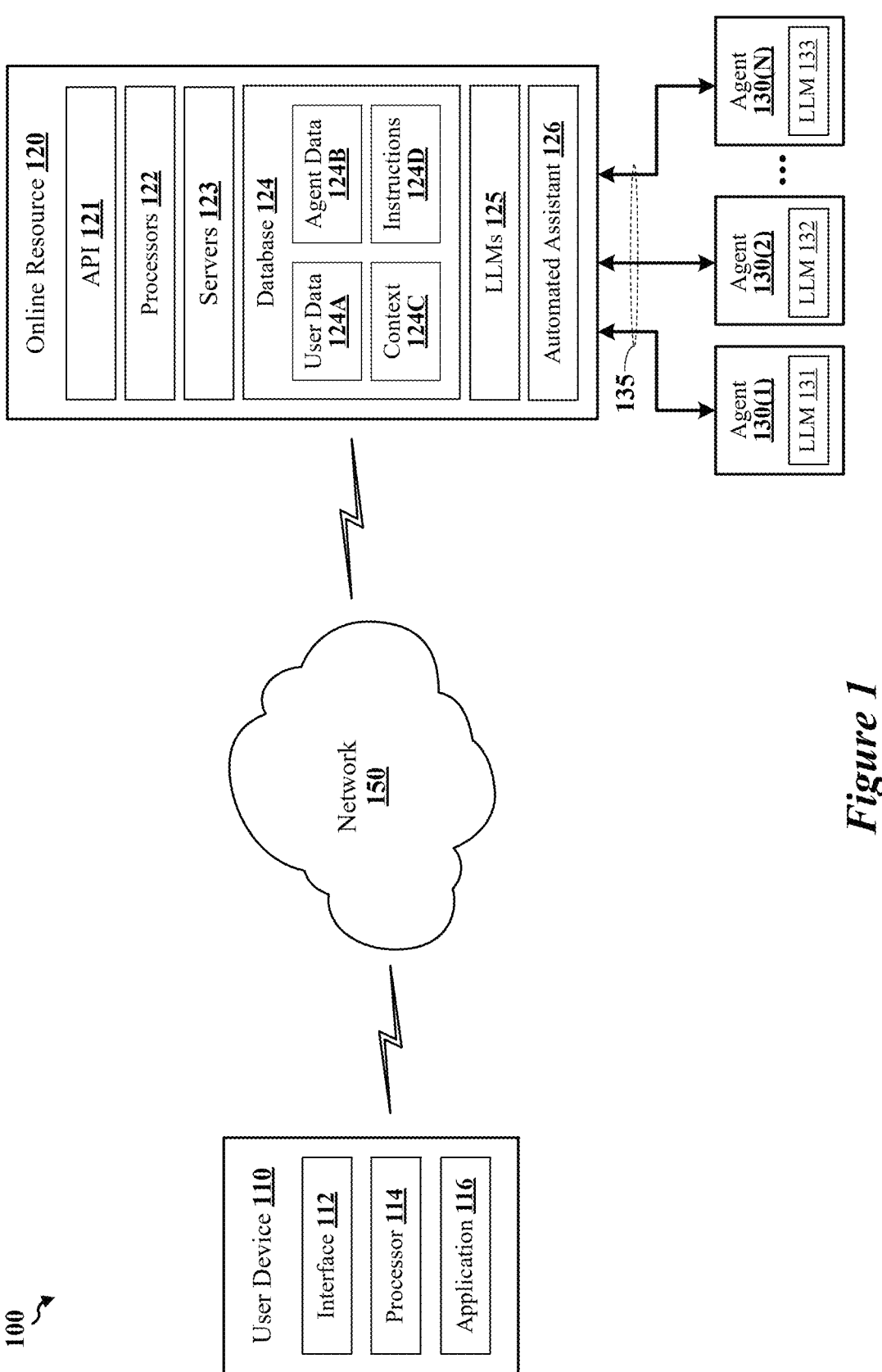
FIG. 1 shows an example network environment associated with an online resource, according to some implementations.

Implementations of the subject matter described in this disclosure may be used to assist a user of an online resource by providing an automated assistant that can answer complex and/or multi-part user questions, retrieve data and other information from one or more accounts associated with the user, and perform various tasks associated with products, services, or subscriptions provided by the online resource, among other examples. In some instances, the user can request the online resource to initiate a conversation between the user and the automated assistant over a communications network. The conversation may be conducted using an online chat, a messaging platform, or a voice call, among other examples. During the conversation, the user can provide, over the communications network, a query for the automated assistant to answer. The query is decomposed into a plurality of sub-queries, and a context is determined for each sub-query. One of a plurality of agents is selected for each sub-query based at least in part on the determined contexts, and the sub-queries are routed to their respective selected agents. Each agent generates a response for its corresponding sub-query using an associated large language model (LLM) that can be configured to generate responses for queries having a unique context or group of contexts. In some aspects, each LLM can be trained using query-and-response relationships associated with a respective context or group of contexts. The responses are collected, summarized, and combined into an answer that is responsive to the user query. The answer can be sent over the communications network to the user, for example, as part of the conversation between the user and the automated assistant.

By decomposing the user query into a plurality of sub-queries based on their respective contexts and routing each of the sub-queries to a respective agent that is configured to generate responses for queries associated with a unique context or group of contexts, aspects of the subject matter disclosed herein may reduce latencies associated with generating responses to user queries. Aspects of the subject matter disclosed herein may also improve the accuracy of such responses, for example, because each agent repeatedly handles similar queries (e.g., queries involving the same, similar, or overlapping contexts) and can therefore be continuously trained with correct query-and-response training data indicated by the online resource. For example, a first agent and its associated LLM can be configured to generate responses to queries pertaining to accounting questions, a second agent and its associated LLM can be configured to generate responses to queries pertaining to tax questions, and a third agent and its associated LLM can be configured to generate responses to queries pertaining to product questions, among other examples. Sub-queries associated with accounting matters may then be routed to the first agent, sub-queries associated with tax matters may then be routed to the second agent, and sub-queries associated with product questions may then be routed to the third agent, thereby ensuring that each of the sub-queries is routed to an agent that has been configured and trained to generate responses to queries having the same or similar context. In some aspects, the responses generated by the first, second, and third agents can be paired with their respective sub-queries to form corresponding query-and-response relationships that, in turn, can be used to train (and retrain) the first, second, and third agents, respectively. In this way, the online resource can increase the likelihood that the responses generated by the selected agents are accurate and responsive to their corresponding sub-queries.

The context for a query can include content, topics, subject matters, key words, and/or attributes, among other examples. In some instances, the context can include one or more previous portions of the conversation between the user and the automated assistant. For example, if a user query includes multiple topics (e.g., how do I add an employee, how do I add a vendor, how do I run payroll, how much does my company owe in taxes, or how much did insurance cost per employee last year), the query can be decomposed into a plurality of sub-queries based on their respective contexts (e.g., different topics or key words, among other examples), and one of a plurality of different agents can be selected for each sub-query based on a comparison between the context of the sub-query and the agent description associated with the selected agent. In other instances, the context can include a browsing history of the user within a user assistance web page, or other websites associated with the online resource.

Aspects of the subject matter disclosed herein are not an abstract idea such as a mental process that can be performed in the human mind, for example, because the human mind is not capable of implementing an online resource that is accessible by users over one or more communications networks (e.g., the Internet). Nor is the human mind capable of transmitting queries to an online resource or receiving queries from another electronic device over one or more communications networks. Indeed, the human mind is neither equipped to nor capable of transmitting or receiving anything over a communications network—let alone transmitting or receiving queries to or from an automated assistant associated with an online resource over any communications network. Further, the human mind is not capable of implementing any generative AI models, and so for example the human mind is not capable of implementing a large language model or LLM, much less using such an LLM for processing queries, altering such queries based on various contexts, or selecting a most appropriate agent from a plurality of agents which is most appropriate for answering a given query. Lastly, the human mind is not capable of sending any queries from an online resource to a selected agent, nor of receiving a response generated by the selected agent. Aspects of the subject matter disclosed herein are not an abstract idea such as a method of organizing human activity because the claims of this patent application do not recite any fundamental economic practice, commercial interaction, legal interaction, or business relations. Moreover, various aspects of the present disclosure provide a technical solution to a technical problem rooted in technology, namely, improving the capability of a computing device to automatically generate responses to complex human language queries submitted by its users.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. As such, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows an example network environment 100 associated with an online resource, according to some implementations. The network environment 100 is shown to include a user device 110, an online resource 120, a plurality of agents 130(1)-130(N), and a communications network 150. The user device 110, which can be any suitable wired or wireless computing device that can access and communicate with the online resource 120 over the communications network 150, is associated with a registered user of the online resource 120. In some instances, the user device 110 can be a desktop computer, laptop computer, tablet computer, personal digital assistant, cellular telephone, smartphone, electronic book reader, or other suitable device capable of accessing and communicating with the online resource 120 over the communications network 150. Although only one user device 110 is shown in the example of FIG. 1 for simplicity, any number of other user devices can be used to connect other users to the online resource 120 over the communications network 150. In addition, although not shown for simplicity, the network environment 100 may include other computing devices, servers, interfaces, online resources, or third-party systems.

The user device 110 is shown to include an interface 112, a processor 114, and an application 116. The interface 112 can be used by the user to interact with the online resource 120 over the communications network 150. For example, the interface 112 allows the user to enter requests, queries, and other information that can be transmitted to the online resource 120 by one or more transceivers (not shown for simplicity) associated with the user device 110. The interface 112 also allows the user to view and interact with data, reports, content, messages, services, and other information provided by the online resource 120 and transmitted to the user device 110. In various aspects, the interface 112 may include a display screen, an audio interface, a virtual reality headset, an augmented reality headset, a digital assistant, a haptic interface, a motion-detection interface, a sensor interface, a keyboard, a trackpad, a trackball, and/or a mouse (among other examples) that can receive spoken queries and/or typed queries from the user, and present audible responses and/or graphical responses to such user queries. In some aspects, the interface 112 may include a specialized automated assistant interface that can facilitate a conversation between the user and an automated assistant associated with the online resource 120.

The processor 114 can be any suitable one or more processors capable of executing scripts or instructions of one or more software programs stored in memory associated with the user device 110. In some instances, the processor 114 can include or can be associated with a non-volatile memory that stores the scripts or instructions. In other instances, the processors 122 can be or can include an Application Specific Integrated Circuit (ASIC), one or more Field Programmable Gate Arrays (FPGAs), or one or more Programmable Logic Devices (PLDs).

The software application 116, which in some instances can be an "App" suitable for mobile devices, allows the user to access, communicate, and exchange information with the online resource 120 over the communications network 150. For example, when executed by the processor 114, the application 116 can allow the user to login to the online resource 120 and thereafter interact with content and services associated with the online resource 120. In addition, or in the alternative, the user device 110 may include a generic browser through which the user can access, communicate with, and exchange information with the online resource 120.

The online resource 120 may provide a broad range of products, applications, services, subscriptions, and the like to a plurality of users (for simplicity, the users are not shown in FIG. 1) that can register, communicate, and exchange information with the online resource 120 via user devices such as user device 110. In the example of FIG. 1, the online resource 120 is shown to include an application program interface (API) 121, one or more processors 122 and/or one or more servers 123, a database 124, one or more large language models (LLMs) 125, and an automated assistant 126. The API 121 can provide a programmatic interface that allows the user device 110 to communicate with the online resource 120 over the communications network 150. In some instances, the programmatic interface of the API 121 can allow the application 116 residing on the user device 110 to request invocation of the automated assistant 126, to receive one or more user queries from the user device 110, and to transmit responses to the one or more queries over the communications network 150 to the user device 110, among other examples. In other instances, the API 121 can implement a user portal through which a web browser associated with the user device 110 can access the online resource 120, request invocation of the automated assistant 126, send one or more user queries to the online resource 120, and receive responses to the one or more queries generated by the online resource 120, among other examples.

In various aspects, the API 121 can receive requests from the user device 110 as Hyper-Text Transfer Protocol (HTTP) requests, API requests, or other web-based requests and thereafter communicate with the user device 110 sing one or more Hyper Text Markup Language (HTML) files responsive to the request. In some instances, the API 121 may, in conjunction with an application logic layer (not shown for simplicity), generate the HTML files as web pages that can be transmitted to the user device 110 over the communications network 150. In some aspects, the user device 110 may present HTML files received from the online resource 120 as web pages to the user.

The processors 122 can be any suitable one or more processors capable of executing scripts or instructions of one or more software programs stored in memory associated with the database 124. In some aspects, the processors 122 can include one or more ASIC, FPGAs, or PLDs, among other examples. In accordance with aspects of the present disclosure, the processors 122 can execute instructions stored in the database 124 to perform various operations described herein with respect to the flow charts of FIGS. 5A and 5B.

The servers 123 may include various types of servers such as (but not limited to) a web server, a news server, a file server, an application server, a database server, a proxy server, or any other server suitable for performing functions or processes described herein. Each server 123 may be a unitary server or a distributed server spanning multiple computers or multiple datacenters, and may include hardware, software, or embedded logic components or a combination of two or more such components for carrying out the appropriate functionalities implemented or supported by the server 123. In some instances, each server 123 may include one or more processors (such as processors 122)

capable of executing scripts or instructions of one or more software programs stored in an associated memory. In other instances, the servers 123 may be implemented using any suitable number of ASICs, FPGAs, or PLDs, among other examples.

The database 124 stores user data, product data, service data, and other information associated with the online resource 120. In some instances, the database 124 can be a relational database capable of manipulating various data sets using relational operators. The database 124 can also use Structured Query Language (SQL) for performing queries and database maintenance, and information stored in the database 124 can be arranged in tabular form, either collectively in a feature table or individually within each of the data sets. In the example of FIG. 1, the database 124 is shown to include a user data store 124A, an agent data store 124B, a context data store 124C, and instructions 124D.

The user data store 124A may store profile information for users registered with or otherwise associated with the online resource 120. The profile information for a respective user may include personal information and/or personal attributes including (but not limited to) name, age, birthday, gender, current residence, hometown, birthplace, educational history, work history, current or former employers, spousal information, children information, among other examples. In various aspects, the user data store 124A may also store documents, files, and other information associated with one or more user accounts provided by the online resource 120. For example, in some aspects, a respective user may have an accounting software service or subscription provided by the online resource 120, a tax preparation software service or subscription provided by the online resource 120, a banking account provided by the online resource 120, and/or a mortgage account provided by the online resource 120, among other examples.

The agent data store 124B may store configuration information, training data, agent descriptions, and/or other information for each of the plurality of agents 130(1)-130(N). The configuration information for a respective agent 130 may be used to configure the respective agent 130 to generate responses to user queries associated with one or more contexts (or groups of contexts). The training data for a respective agent 130 may be used to train an LLM or a generative AI model) associated with the respective agent 130 with query-and-response data pertaining to one or more associated contexts (or groups of contexts). The agent descriptions may describe or indicate one or more contexts associated with each of the plurality of agents 130(1)-130 (N). In some instances, the agent descriptions can be used to select one of the agents 130(1)-130(N) to generate responses for each of a plurality of sub-queries decomposed from a user query. For example, the agent descriptions can be compared with the context for a respective sub-query to determine a degree of similarity between the context and each of the agent descriptions, and the agent 130 whose agent description is most similar to the context for the respective query can be selected to generate the response to the respective sub-query. In some aspects, the agent 130 associated with the highest degree of similarity is selected to generate the response for the respective sub-query. In other instances, the agent descriptions can indicate an assignment of one or more contexts to each of the plurality of agents 130(1)-130(N). In these instances, a respective sub-query of a user query can be routed to the agent 130 that is assigned to the context for the respective sub-query.

The context data store 124C may store a plurality of contexts that can be associated with user queries and/or sub-queries. Each context can include one or more of content, topics, subject matters, key words, or attributes, among other examples. In some instances, the context can include one or more previous portions of the conversation between the user and the automated assistant. For example, if a user query includes multiple topics (e.g., how do I add an employee, how do I add a vendor, how do I run payroll, how much does my company owe in taxes, or how much did insurance cost per employee last year), the online resource 120 decomposes the user query into a plurality of sub-queries based on their respective contexts (e.g., different topics), and selects one of the agents 130(1)-130(N) for each sub-query based on a comparison between the context for the sub-query and the agent descriptions stored in the agent data store 124B. In other instances, the context can include a browsing history of the user within a user assistance web page, or other websites associated with the online resource 120. In some other instances, the context can include a type of application through which the user sends the request to the online resource 120.

The instructions 124D may include one or more sets of instructions, scripts, or machine-readable commands that can be executed by the processors 122 and/or the servers 123 to implement various functions and operations associated with the online resource 120. For example, execution of the instructions 124D can cause the online resource 120 to perform some or all of the operations described below with respect to the flow charts of FIGS. 5A and 5B.

The LLMs 125 may include one or more LLMs that are configured to generate responses to user queries or sub-queries in an accurate manner with minimal latencies. In various aspects, the LLMs 125 can be configured and trained to receive queries or sub-queries in a natural language format and to generate their respective responses in a natural language format. In some aspects, the LLMs 125 can be pretrained by the online resource 120. The LLMs 125 may be responsive to typed or entered queries or sub-queries, as well as spoken or verbal queries or sub-queries. In some instances, the LLMs 125 can form part of one or more generative AI models. In addition, or in the alternative, the LLMs 125 can be associated with Natural Language Processors (NLPs). Further, although the LLMs 125 are shown in the example of FIG. 1 as residing within the database 124 of the online resource 120, in other implementations, at least some of the LLMs 125 may be external to the online resource 120 (such as within one or more corresponding agents 130(1)-130(N)).

The automated assistant 126 can be used to assist the user navigate websites and pages provided by the online resource 120, to assist the user with obtaining answers to questions pertaining to the operations, functionalities, capabilities, and/or other aspects of one or more products or services associated with the online resource 120, and to assist the user with obtaining answers to requests for data and other information associated with one or more user accounts provided by the online resource 120, among other examples. In some instances, the automated assistant 126 can be invoked by the user uttering a designated word or phrase (e.g., "open the automated assistant") into the user device 110, by the user touching an icon displayed on a mobile device, or by the user clicking a button or link presented on a monitor, among other examples. When invoked by the user, the automated assistant can initiate a conversation between the user and the automated assistant over the communications network 150. In some instances, the conversation may be conducted over an online chat. In other instances, the conversation may be conducted over a messaging feature accessible to the user. In some other instances, the conversation may be conducted over a voice call with the user.

During the conversation, the automated assistant 126 can identify a plurality of queries spoken or input by user and determine a context for each of the identified queries. For each of the identified queries, the automated assistant 126 can select one of the agents 130(1)-130(N) to respond to the query based on the determined context, and then send the queries to their respective selected agents 130. The automated assistant 126 may receive responses to the plurality of queries from the selected agents, combine the received responses into an answer that is responsive to the plurality of queries, and present the answer to the user via the user device 110.

The plurality of agents 130(1)-130(N) are shown in the example of FIG. 1 as being coupled to the online resource 120 via connection 135. In various aspects, the connection 135 may include one or more wireless connections (such as a Wi-Fi, LAN, WAN, MAN, cellular, or 5G network, among other examples) and/or one or more wired connections 135 (e.g., such as Ethernet cables or optical connections, among other examples. The agents 130(1)-130(N) can employ any suitable communication protocols to facilitate access and the exchange of data (such as receiving user queries and transmitting their respective responses) with the online resource 120. In some implementations, the online resource 120 and each of the agents 130(1)-130(N) may include a dedicated API through which the online resource 120 sends user queries to the selected agents 130 and the selected agents 130 send their respective responses to the online resource 120. In other implementations, the plurality of agents 130 (1)-130(N) can be part of the online resource 120, in which case the connection 135 and dedicated APIs.

The agents 130(1)-130(N) can include (or can be otherwise associated with) large language models (LLMs) 131-133, respectively. The LLMs 131-133 can be any suitable large language model that can be used to generate responses to one or more portions of a user query. The LLMs 131-133 can be configured and/or trained to receive queries or sub-queries in a natural language format and to generate responses in a natural language format. For example, the LLMs 131-133 may be responsive to queries typed by the user, to queries entered by the user via a touch pad or touch screen, and/or to queries spoken by the user, among other examples. The LLMs 131-133 can form part of one or more generative AI models that can be trained to generate responses to complex or multi-part user queries. In other aspects, the LLMs 131-133 can be associated with one or more Natural Language Processors (NLPs). Further, although the LLMs 131-133 are shown in the example of FIG. 1 as residing within respective agents 130(1)-130(N), in other implementations, the LLMs 131-133 can be implemented using the LLMs 125 associated with the online resource 120.

The agents 130(1)-130(N) can be configured to generate responses to different user queries (or sub-queries), for example, such as queries pertaining to different contexts. In some instances, the LLMs 131-133 associated with respective agents 130(1)-130(N) can be trained using query-and-response training data associated with a unique context or a unique group of contexts. For example, a first agent 130(1) may be configured to generate responses for queries that involve accounting matters and its associated LLM 131 can be trained using query-and-response relationships pertaining to established accounting principles, applicable accounting rules and regulations, and/or banking practices, among other examples, a second agent 130(2) may be configured to generate responses for queries that involve tax-related matters and its associated LLM 132 can be trained using query-and-response relationships pertaining to tax laws, regulations, and/or common practices, among other examples, and a third agent 130(3) may be configured to generate responses for queries involving product or service questions (such as a help line or link for an online mortgage service) and its associated with LLM 133 can be trained using query-and-response relationships pertaining to user questions about how to perform certain operations or tasks associated with products or services provided by the online resource 120 (such as how to run a report, how to generate a graph indicative of certain data or trends, or how to access an account or service provided by the online resource 120). In some instances, training data used to train the LLMs 131-133 may include only query-and-response relationships that resulted in a positive or successful user experience (e.g., having a user rating that exceeds a threshold). In some aspects, the training data can include query-and-response relationships determined for one or more previous portions of the conversation between the user and the automated assistant 126.

By decomposing a user query into a plurality of sub-queries based on their respective contexts and routing each of the sub-queries to a respective agent 130 that is configured and/or trained to generate responses for queries involving the respective context, the agents 130(1)-130(N) may reduce latencies associated with generating responses to user queries. The agents 130(1)-130(N) may also improve the accuracy of such responses, for example, because each agent 130 repeatedly handles similar queries (e.g., queries involving the same, similar, or overlapping contexts) and can therefore be continuously trained with correct query-and-response training data indicated by the online resource 120. More specifically, for the example above in which the first agent 130(1) is selected to respond to queries pertaining to accounting matters and the second agent 130(2) is selected to respond to queries pertaining to tax matters, the first agent 130(1) is trained with query-and-response relationships involving accounting matters and is therefore more likely to generate an accurate response to an accounting-related query than the second agent 130(2). Similarly, the second agent 130(2) is trained with query-and-response relationships involving tax matters and is therefore more likely to generate an accurate response to a tax-related query than the first agent 130(1). In this way, the online resource 120 can increase the accuracy of agent-generated responses while minimizing latencies by selecting the first agent 130(1) to respond to accounting-related queries and selecting the second agent 130(2) to respond to tax-related queries.

The communications network 150 provides communication links between the online resource 120 and the user device 110. The communications network 150 can be any suitable one or more communication networks including, for example, the Internet, a wide area network (WAN), a metropolitan area network (MAN), a wireless local area network (WLAN), a personal area network (PAN) such as Bluetooth®, a portion of the Public Switched Telephone Network (PSTN), a cellular telephone network, a radio access network (RAN) such as a Fifth Generation (5G) New Radio (NR) system, an Ethernet network, a cable network, a satellite network, or any combination thereof. In other implementations, the communications network 150 may provide communication links between the online resource 120 and each of the agents 130(1)-130(N).

Figures 2, 3:
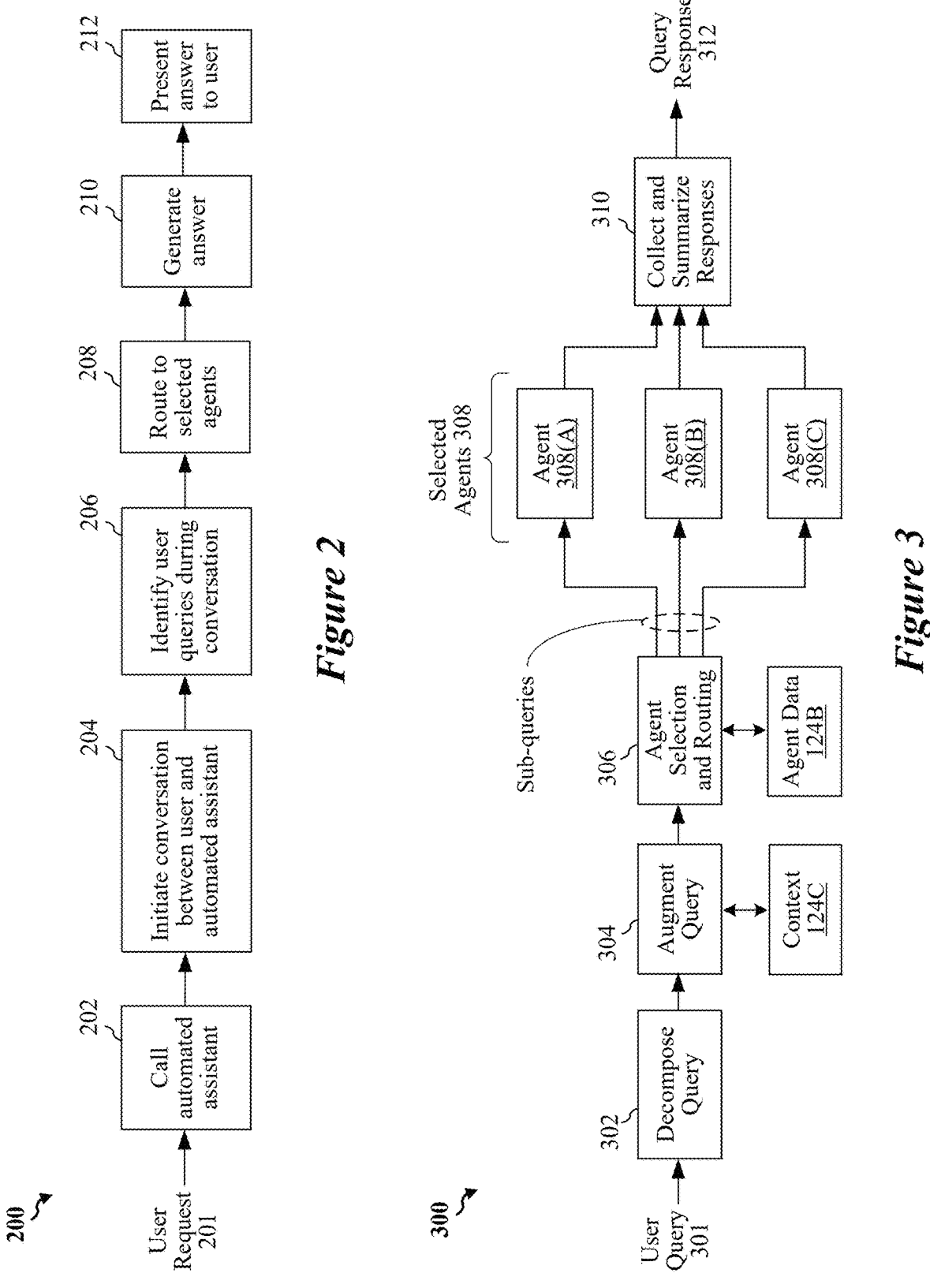
FIG. 2 shows an example process flow for routing user requests from an automated assistant associated with an online resource, according to some implementations.
FIG. 3 depicts an example process flow for generating and summarizing responses to complex queries from a user, in accordance with some implementations.

FIG. 2 depicts an example process flow 200 for routing user requests from an automated assistant associated with an online resource, in accordance with some example implementations. For example, the process flow 200 may be performed by the online resource 120 in conjunction with the plurality of agents 130(1)-130(N) described with respect to FIG. 1. The process flow 200 begins with the user sending a request 201 for an automated assistant to the online resource 120 via the user device 110. As discussed, the request 201 may be a spoken word or phrase, a word or phrase entered as text, the user touching an icon on a display screen, the user clicking on a button or link presented on a display screen, and the like. In response to receiving the request 201, the online resource 120 calls, executes, or otherwise invokes the automated assistant 126 described with respect to FIG. 1 (202). When invoked, the automated assistant 126 initiates a conversation with the user over the communications network 150 (204). The conversation may be conducted over a voice call, an online chat session, or an electronic messaging feature, among other examples. In some aspects, the automated assistant 126 is presented to the user as a dialogue box on a display screen associated with the user device 110. In other aspects, the automated assistant 126 is presented to the user as a participant in a native messaging app or program executing on the user device 110. In some other aspects, the automated assistant 126 is presented to the user as a participant in a voice call with the user.

The online resource 120 identifies queries spoken or input by the user during the conversation (206), and then routes the identified queries to their respective selected agents for generating responses to the identified queries (208). As discussed, the online resource 120 may determine a context for each of the identified queries and use the determined contexts to select one of the agents 130(1)-130(N) for responding to each of the identified queries. In some instances, the online resource 120 can compare the context of a respective query with the agent descriptions associated with available agents 130(1)-130(N) and select the agent 130 whose description most closely matches the context of the respective query. The context may include topics, one or more previous portions of the conversation between the user and automated assistant, a browsing history of the user within a user assistance page or web site associated with the online resource, a type of application through which the user sends the request to the online resource, or any combination thereof.

In various aspects, the online resource 120 may determine a similarity score for each of the agents 130(1)-130(N) relative to a query and use the similarity scores to select one of the agents 130(1)-130(N) to respond to the query. More specifically, the online resource 120 may determine similarity scores indicating a degree of similarity between the context of the query and each of the agent descriptions stored in the agent data 124B and then select the agent 130 associated with the highest similarity score. In some aspects, the online resource 120 can generate a first vector indicative of the context and generate a plurality of second vectors indicative of the agent descriptions associated with the agents 130(1)-130(N). The online resource 120 can determine the similarity score for a respective agent 130 based on a cosine distance between the first vector and the second vector associated with the respective agent 130. In other aspects, the online resource 120 can determine the similarity scores based on Euclidean distances between the context and each of the agent descriptions.

The online resource 120 combines the responses generated by the selected agents 130 to generate an answer that is responsive to the identified queries (210). In some aspects, the online resource 120 may collect and summarize the responses from the selected agents 130 in conjunction with generating the answer. Thereafter, the online resource 120 presents the answer to the user via the user device 110 (212). In some aspects, the automated assistant 126 presents the answer in a dialogue box on a display screen associated with the user device 110. In other aspects, the automated assistant 126 presents the answer to the user as a participant in a native messaging app or program executing on the user device 110. In some other aspects, the automated assistant 126 presents the answer in a voice call with the user.

FIG. 3 depicts an example process flow 300 for generating and summarizing responses to complex queries from a user, in accordance with some implementations. For example, the process flow 300 may be performed by the online resource 120 or another suitable device or system capable of receiving queries from users. With respect to FIG. 3, a user query 301 may be received from a user device, such as the user device 110. In some implementations, the user query 301 may be received via the network 150 or another suitable wired or wireless interface to the user device 110.

When the user query 301 includes multiple questions of varying context, the user query 301 is decomposed into different sub-queries based on their respective contexts (302), for example, so that each of the different sub-queries can be routed to different selected agent for generating a relevant response. For example, the query decomposition may be performed by the automated agent 126 using one or more of the LLMs 125. The decomposed sub-queries may then be augmented (304). The augmentation may be based on context, such as the context 124C, and may include contextual information associated with a respective sub-query. The contextual information may include portions of previous queries or comments received from the user. The contextual information may also include information about the user submitting the user query 301, such as one or more usernames, account information, user demographic information, which application or which functionality within that application the user was accessing when submitting the user query 301, and so on. In some aspects, the query augmentation may add to or rephrase a sub-query based on such context.

After the sub-queries of the user query 301 have been augmented, appropriate agents may be selected for each of the augmented sub-queries and each of the augmented sub-queries routed to their selected agent (306). For example, each agent of the agents 130 may be associated with corresponding agent description data in the agent data 124B, and each augmented sub-query may be assigned to a respective agent based on the augmented sub-query and the agent description data. In some aspects, the automated agent 126 may use one or more of the LLMs 125 to assign each augmented sub-query to a respective agent based on a comparison of the augmented sub-query to the agent description data. In some aspects, the available agents may be limited based on the context of the query, such as an application or geographic region associated with the user query 301. For example, a different set of agents may be available for user queries which are associated with an accounting application as compared to user queries associated with an email application, or a social media application.

The augmented sub-queries may be routed to the selected agents. For example, the agent data 124B may include routing data for each agent, and the augmented sub-queries may be routed to the appropriate agent via the routing data associated with the selected agents. With respect to FIG. 3, the augmented sub-queries are routed to agents 308(A), 308(B), and 308(C) (the "selected agents 308").

The selected agents 308 may generate responses to their respective augmented sub-queries and provide the generated responses to the online resource 120. For example, the generated responses may be provided to the automated assistant 126 of the online resource 120. In order to provide a single response to the user query 301 rather than providing multiple different responses, the generated responses may be collected and summarized (310) into a single query response 312. For example, the automated assistant 126 can use one or more of the LLMs 125 to collect and summarize the responses received from the selected agents 208 to generate a natural language answer that is responsive to all of the sub-queries associated with the user query 301. The resulting natural language answer can be transmitted to the user device 110 over the communications network 150 and presented to the user via the user interface 112 of the user device 110. The automated assistant 126 can present the answer to the user as part of the conversation between the user and the automated assistant 126. In some instances, the automated assistant 126 can present the answer to the user in a suitable dialogue box displayed on the user interface 112. In other instances, the automated assistant 126 can present the answer to the user in a suitable dialogue box displayed on the user interface 112.

Figure 4:
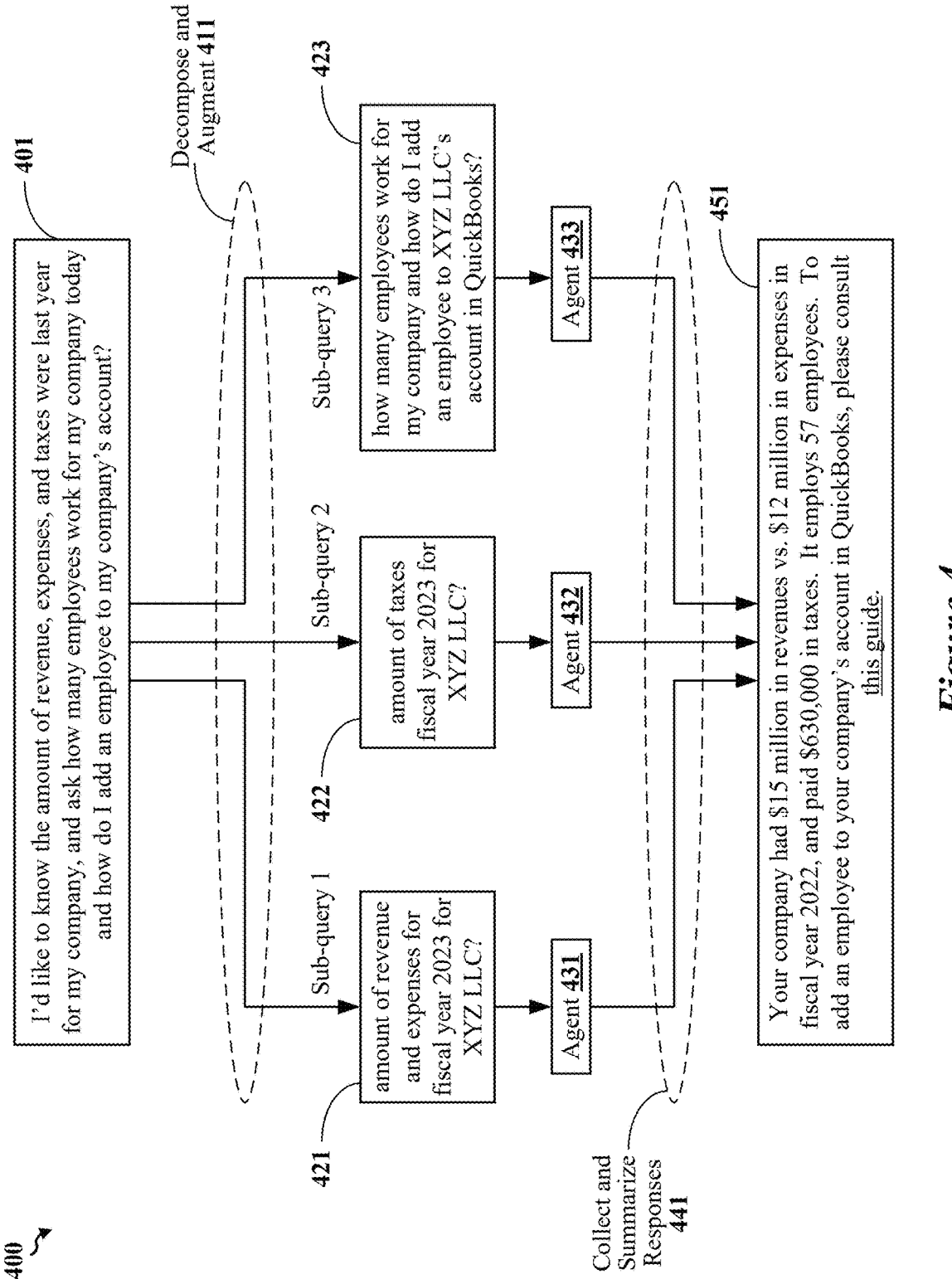
FIG. 4 shows an example process flow through which an example query is decomposed, augmented, and answered, according to some implementations.

FIG. 4 shows an example process flow 400 through which an example query is decomposed, augmented, and answered, according to some implementations. In various aspects, the process flow 400 may be performed by the online resource 120 of FIG. 1 and/or may be based on the example process flow 300 described with respect to FIG. 3. For example, in some aspects, the queries may be received from the user device 110 via the network 150 or another suitable wired or wireless interface.

A query 401 may be received by the online resource 120. As shown in FIG. 4, the query 401 includes multiple requests for information about the user's company, relating to the user's company revenue, expenses, taxes, and employee headcount. The query 401 also includes a request for instructions on adding an employee to their company's account.

As described above with respect to the process flow 300 of FIG. 3, complicated queries, such as the query 401, may be decomposed into simpler sub-queries, and augmented using context. Similarly, with respect to the query answering flow 400, the query 401 may be decomposed and augmented (411) into several sub-queries, namely a first sub-query 421, a second sub-query 422, and a third sub-query 423. Note that the specific decomposition shown in FIG. 4 is only one example of how a complicated query may be decomposed using the example implementations. For example, sub-query 423 includes both a request for information and a request for assistance with software, and in some aspects, this sub-query may instead be decomposed into two sub-queries, a first sub-query requesting employee headcount for their company, and a second sub-query requesting assistance with adding employees to a company account.

For example, a different agent may be configured to provide software assistance as compared to providing information about the user's accounts and employee information. As discussed above, in addition to decomposing the query 401 into multiple sub-queries, each sub-query may be augmented based on the user's context. For example, while the query 401 refers to "my company" and to "last year," the sub-queries 421, 422, and 423 augment that query with the actual name of the user's company (XYZ LLC) and the specific year (fiscal year 2022). Similarly, the sub-queries may be augmented based on the context of the query's submission, such as the application through which the user submitted the query 401. For example, the user may submit the query 401 through the QuickBooks application, and this context may be used to augment the sub-query 423 to request instruction on adding an employee to XYZ LLC's account in QuickBooks specifically based on this context. While not shown in FIG. 4 for simplicity, the sub-queries 421, 422, and 423 may also include additional details, such as one or more identifying details for XYZ LLC, one or more portions of the user's conversation history relevant to a particular sub-query, and so on.

The decomposed and augmented sub-queries may be routed to various selected agents for generating responses. As discussed above with respect to FIG. 3, each sub-query may be routed to a corresponding agent based at least in part on context associated with of the query. In some instances, the context may include the type of software application through which the user submitted the query to the online resource 120. For example, if the user submitted the query via an accounting application or accounting web portal, then the corresponding sub-queries may be routed to agents configured to generate responses to accounting related queries. For another example, if the user submitted the query via a tax software or tax preparation web portal, then the corresponding sub-queries may be routed to agents configured to generate responses to tax related queries. In other instances, the context may include the type of software application through which the user submitted the query to the online resource 120. For example, if the user submitted the query via an accounting application or accounting web portal, then the corresponding sub-queries may be routed to agents configured to generate responses to accounting related queries.

In various aspects, the selection of agents for a respective sub-query may also be based on agent descriptions in view of the content or context of the sub-query. For example, the automated assistant 126 may use one or more of the LLMs 125 to compare the sub-query with the agent descriptions associated with a plurality of available agents to determine the most suitable agent to generate responses to each of the sub-queries identified in the conversation between the user and the automated assistant 126. In the example of FIG. 4, a first agent 431 is selected for the first sub-query 421, a second agent 432 is selected for the second sub-query 422, and a third agent 431 is selected for the third sub-query 423. After selecting agents for each of the sub-queries 421-423, the automated assistant 126 may route the sub-queries 421, 422, and 423 to their respective agents 431-433.

The selected agents 431-433 generate responses for their respective sub-queries and forward the generated responses to the online resource 120 for collection and summarization 441. For example, the selected agents 431-433 may return the generated responses to the automated assistant 126 for collection and summarization 441. For example, the collection and summarization 441 may be performed by the automated assistant 126 using one or more of the LLMs 125.

After collecting and summarizing the responses generated by the selected agents, a single answer 451 to the user's query 401 may be generated and provided to the user. For example, the answer 451 may be provided to the user device 110 via the network 150 or another suitable wired or wireless interface. In the example of FIG. 4, the answer 451 responds to the user's query for revenue and expenses, and taxes in the last year, as well as providing employee headcount and instructions for adding an employee to the user's company account. In some aspects, the summarization may include one or more links to information the user has requested. For example, the user query 401 requested information on adding employees to their company's account, and the answer 451 includes a link to a guide for adding employees using the software through which the user submitted the query 401 (in this case QuickBooks). In some other aspects, the contents of such a guide or help article may be directly included in the answer 451. In some aspects, the answer 451 may be based on the terminology used in the query 401. For example, while the deconstructed and augmented sub-queries referred to the user's company by name, the query 401 refers to "my company." In some aspects, the answer 451 may include the user's own terminology, specifying that "your company had $15 million in revenues . . ." rather than stating that XYZ LLC had $15 million in revenues. In some other aspects, the answer 451 may not be based on the query 401 but instead only on the answers generated in response to the sub-queries 421, 422, and 423.

FIG. 5A shows an illustrative flowchart 500 depicting an example operation for routing user requests from an automated assistant associated with an online resource, according to some implementations. In some implementations, the example operation 500 is performed by the online resource 120 described with respect to FIG. 1. For example, at 502, the online resource 120 receives, from the user over a communications network coupled to the online resource 120, a request for an automated assistant. At 504, the online resource 120 initiates a conversation, over the communications network, between the user and the automated assistant in response to the request. At 506, the online resource 120 identifies a plurality of queries from the user during a portion of the conversation. At 508, the online resource 120 determines a context for each of the plurality of queries. At 510, the online resource 120 selects, for each query, one of a plurality of agents based on the determined context for the respective query. At 512, the online resource 120 sends each of the plurality of queries to a respective agent of the selected agents. At 514, the online resource 120 receives, from each of the selected agents, a response to the respective query of the plurality of queries. The conversation can be conducted over an online chat, a messaging feature accessible to the user, or a voice call with the user, among other examples.

In some instances, selecting the agent for a respective query includes comparing the context for the respective query with an agent description associated with the selected agent. In some instances, selecting the agent further includes determining a degree of similarity between the context and the agent descriptions for the plurality of agent and selecting the agent associated with the highest degree of similarity to generate the response for the respective sub-query. In various aspects, different agents of the plurality of agents can be configured to generate responses to different queries associated with different contexts or different groups of contexts.

Each of the plurality of agents is associated with a corresponding large language model (LLM) trained using query-and-response training data associated with a unique context or a unique group of contexts. The context for a given query can include one or more previous portions of the conversation or a browsing history of the user within a user assistance page or website associated with the online resource, among other examples. In addition, or in the alternative, the context for a given query can be based at least in part on a type of application through which the user sends the request to the online resource.

Figure 5B:
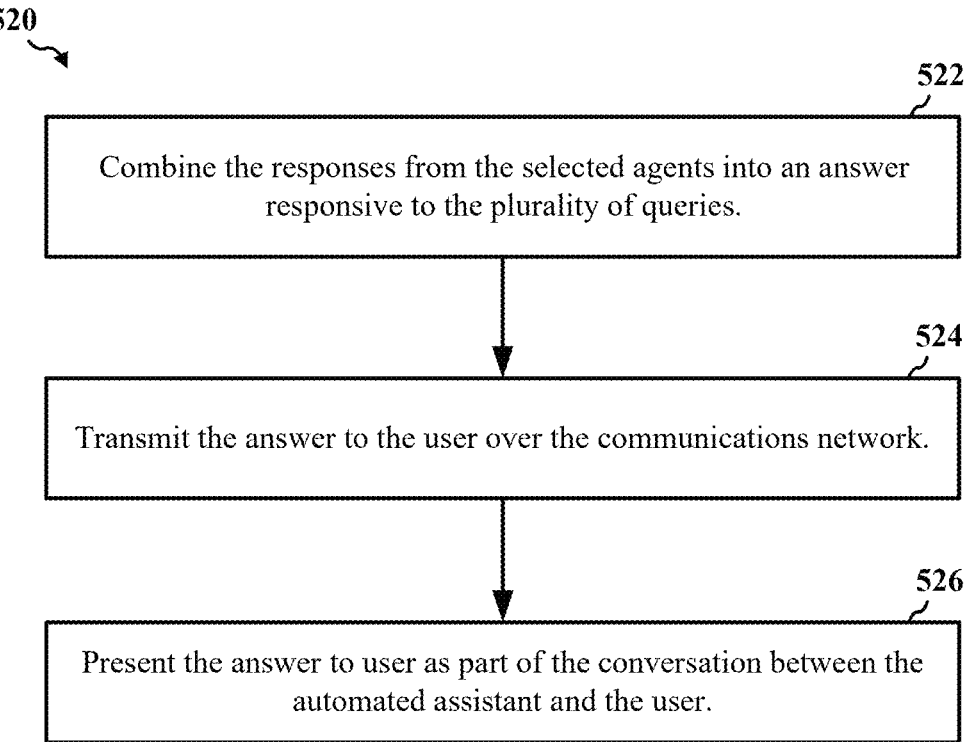
FIG. 5B shows an illustrative flowchart depicting another example operation for routing user requests from an automated assistant associated with an online resource, according to some implementations.

FIG. 5B shows an illustrative flowchart 520 depicting another example operation for routing user requests from an automated assistant associated with an online resource, according to some implementations. The operation 520 may be performed by the online resource 120 of FIG. 1 after the example operation 500 of FIG. 5A. For example, at 522, the online resource 120 combines the responses from the selected agents into an answer responsive to the plurality of queries. At 524, the online resource 120 transmits the answer to the user over the communications network. At 526, the online resource 120 presents the answer to the user as part of the conversation between the automated assistant and the user.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for routing user requests from an automated assistant associated with an online resource, the method performed by one or more processors of a computing system associated with the online resource and comprising:
   receiving, from the user over a communications network coupled to the computing system, a request for an automated assistant;
   initiating a conversation, over the communications network, between the user and the automated assistant in response to the request;
   identifying a plurality of queries from the user during a portion of the conversation;
   determining a context for each of the plurality of queries;
   selecting, for each of the plurality of queries, one agent of a plurality of agents based on the determined context for the respective query by:
      comparing the context for the respective query with agent descriptions of the plurality of agents;
      determining a degree of similarity between the context and each of the agent descriptions of the plurality of agents based on the comparisons; and
      selecting the agent associated with the highest degree of similarity to generate the response for a respective sub-query;
   sending each of the plurality of queries to a respective agent of the selected agents; and
   receiving, from each of the selected agents, a response to the respective query of the plurality of queries, wherein each of the plurality of agents is associated with a corresponding large language model (LLM) trained using query-and-response training data associated with a unique context or a unique group of contexts.

2. The method of claim 1, wherein the context is based at least in part on one or more previous portions of the conversation.

3. The method of claim 1, wherein the context includes a browsing history of the user within a user assistance page or web site associated with the online resource.

4. The method of claim 1, wherein the context is based at least in part on a type of application through which the user sends the request to the online resource.

5. The method of claim 1, wherein different agents of the plurality of agents are configured to generate responses to different queries associated with different contexts or different groups of contexts.

6. The method of claim 1, further comprising:

combining the responses from the selected agents into an answer responsive to the plurality of queries; and transmitting the answer to the user over the communications network.

7. The method of claim 6, further comprising:

presenting the answer to the user as part of the conversation between the automated assistant and the user.

8. A computing system associated with an online resource, the computing system comprising:

one or more processors; and a memory communicatively coupled with the one or more processors and storing instructions that, when executed by the one or more processors, causes the computing system to:

receive, from the user over a communications network coupled to the computing system, a request for an automated assistant;

initiate a conversation, over the communications network, between the user and the automated assistant in response to the request;

identify a plurality of queries from the user during a portion of the conversation;

determine a context for each of the plurality of queries;

select, for each of the plurality of queries, one agent of a plurality of agents based on the determined context for the respective query by:

comparing the context for the respective query with agent descriptions of the plurality of agents;

determining a degree of similarity between the context and each of the agent descriptions of the plurality of agents based on the comparisons; and selecting the agent associated with the highest degree of similarity to generate the response for a respective sub-query;

send each of the plurality of queries to a respective agent of the selected agents; and receive, from each of the selected agents, a response to the respective query of the plurality of queries, wherein each of the plurality of agents is associated with a corresponding large language model (LLM) trained using query-and-response training data associated with a unique context or a unique group of contexts.

9. The computing system of claim 8, wherein the context is based at least in part on one or more previous portions of the conversation.

10. The computing system of claim 8, wherein the context includes a browsing history of the user within a user assistance page or web site associated with the online resource.

11. The computing system of claim 8, wherein the context is based at least in part on a type of application through which the user sends the request to the online resource.

12. The computing system of claim 8, wherein different agents of the plurality of agents are configured to generate responses to different queries associated with different contexts or different groups of contexts.

13. The computing system of claim 8, wherein execution of the instructions further causes the computing system to:

combine the responses from the selected agents into an answer responsive to the plurality of queries; and transmit the answer to the user over the communications network.

14. The computing system of claim 13, wherein execution of the instructions further causes the computing system to:

present the answer to the user as part of the conversation between the automated assistant and the user.

* * * * *